March 11, 1941. T. E. MURRAY Re. 21,745

BOILER

Original Filed May 31, 1923 2 Sheets-Sheet 1

THOMAS E. MURRAY, DECEASED Inventor.
BY JOSEPH B. MURRAY AND
THOMAS E. MURRAY, Jr.,
EXECUTORS By Usina & Kauber Attorneys March 11, 1941. T. E. MURRAY Re. 21,745

BOILER

Original Filed May 31, 1923 2 Sheets-Sheet 2

THOMAS E. MURRAY, DECEASED Inventor
BY JOSEPH B. MURRAY AND
THOMAS E. MURRAY, JR.
EXECUTORS By Wilma & Rauber Attorneys Reissued Mar. 11, 1941 Re. 21,745

UNITED STATES PATENT OFFICE 21,745

BOILER

Thomas E. Murray, deceased, late of Brooklyn, N. Y., by Joseph B. Murray and Thomas E. Murray, Jr., executors, Brooklyn, N. Y., assignors to Metropolitan Engineering Company, Brooklyn, N. Y., a corporation of New York Original No. 2,042,618, dated June 2, 1936, Serial No. 642,427, May 31, 1923. Application for reissue August 5, 1936, Serial No. 94,490

8 Claims. (Cl. 122—235)

This invention relates to boilers and particularly to the construction of boiler walls and boiler furnace walls.

In the accompanying drawings—

Referring to the embodiment of the invention illustrated, the boiler comprises side walls 10 and 12, a front wall 14 and rear wall 16, and a top wall or roof 18.

Figure 4:
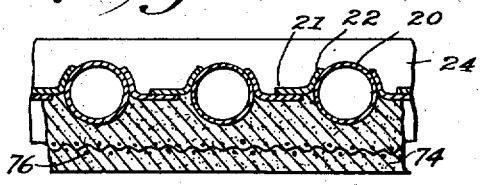
Fig. 4 is a horizontal section of the same.

The side walls 10 and 12 are formed of a series of upright units comprising tubes 20 with lateral metal extensions such as the flanges 21, for instance, Fig. 4, welded to the tubes or otherwise attached thereto with good heat conducting joints. Inner curved portions 22 partly overlying the tubes facilitates such a welded connection.

The tubes 20 are connected into the circulation of the generator, communicating at the top and bottom, respectively, with hollow headers 23 and 24.

Figure 2:
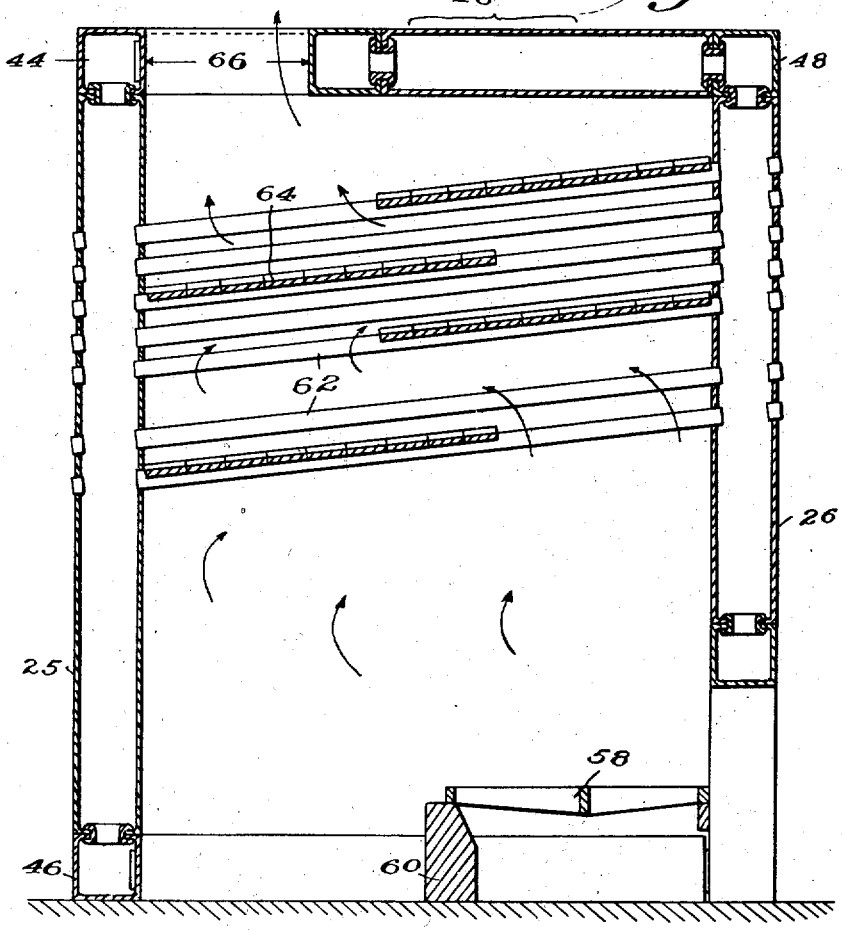
Fig. 2 is a diagrammatical longitudinal section of the same.

The rear wall 16 of the boiler is formed of a multiplicity of upright tubular sections 25 which may be similar to the members 20, 21, or may be ordinary tubular headers, and which are united at the top and bottom to transverse headers 44 and 46 (Fig. 2). The hollow members 26 forming the front wall 14 are connected at the top to a header 48, and at the bottom to a header 50 by communicating nipples or other suitable connection. The header 50 is elevated to leave an opening for the entrance of a known type of stoker. Instead of such stoker, the boiler can be fired manually, in which case fire doors and ash pit doors, not shown, will be provided. The boiler may be provided with a suitable grate diagrammatically shown at 58, Fig. 2, and bridge wall 60 and boiler tubes 62 extending approximately horizontally overhead and heated chiefly by convection. The tubes 62 communicate at their opposite ends with the hollow header members 25 and 26. Suitable baffles 64, such as tile, water tubes or brickwork, are secured in known manner to the boiler tubes so as to cause the products of combustion to follow a sinuous path through the boiler. A flue opening 66 is formed in the roof, leading to the stack.

Figure 3:
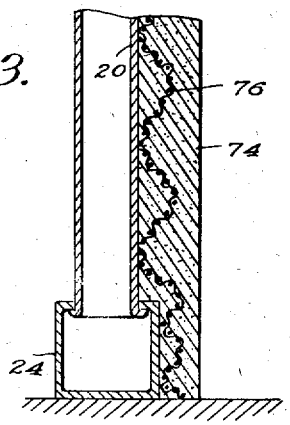
Fig. 3 is a vertical section of a detail.

The tubular side walls are combined with an outer layer or covering of refractory material, such, for example, as the layer or sheathing 74 of plastic insulating material held in place by a reinforcement of woven wire mesh 76 which is bent to the shape shown in Fig. 3 and welded or otherwise secured at intervals to the tubular units, either the tubes 20 or the projections 21, or both. This insulating material can be plastered on after the metal work has been erected and, if desired, may be enclosed by a thin sheet metal shell. This insulating material may be a magnesia mixture of plastic compounds of asbestos and like heat insulators As shown in Figs. 3 and 4, the refractory makes contact with the metal structure throughout substantially the entire face of the latter so as to form a unitary composite wall structure of metal and refractory. The refractory portion conserves the heat to substantially the same extent as in the walls of the old type of furnace. The composite wall structure, by reason of the cooling effect of the tubes, is maintained in condition and has a useful life many times that of the old refractory walls. Preferably the refractory material overlies the anchoring means at the outside, or substantially so, so as to prevent any substantial transmission of heat through the metal to the outer face of the wall. The support which the refractory material derives from the netting or equivalent anchoring means is important particularly with boilers for power plants which are generally very large and work at high temperatures and high pressure. The furnace walls of such boilers are subject to noticeable and sometimes violent vibration and to distortion under the intense heat. The mere adhesion of the plastic to the metal cannot be depended upon to hold the plastic in place. Even where it is enclosed by an outer shell of metal, it is apt to be displaced under the conditions of use. The netting illustrated not only holds the plastic insulation together but also supports its weight from the tubular structure.

The boiler tubes 62 may be of the usual round shape secured to the hollow headers 25 and 26; these being provided with openings opposite the ends of the tubes, which openings are closed by suitable plugs 78. The upright hollow corner tubes 79 are provided with plugged openings 80 which give access to the interior. Similar openings and plugs may be used in the various members for insertion of tools in assembling, or for cleaning sediment or scale.

Figure 1:
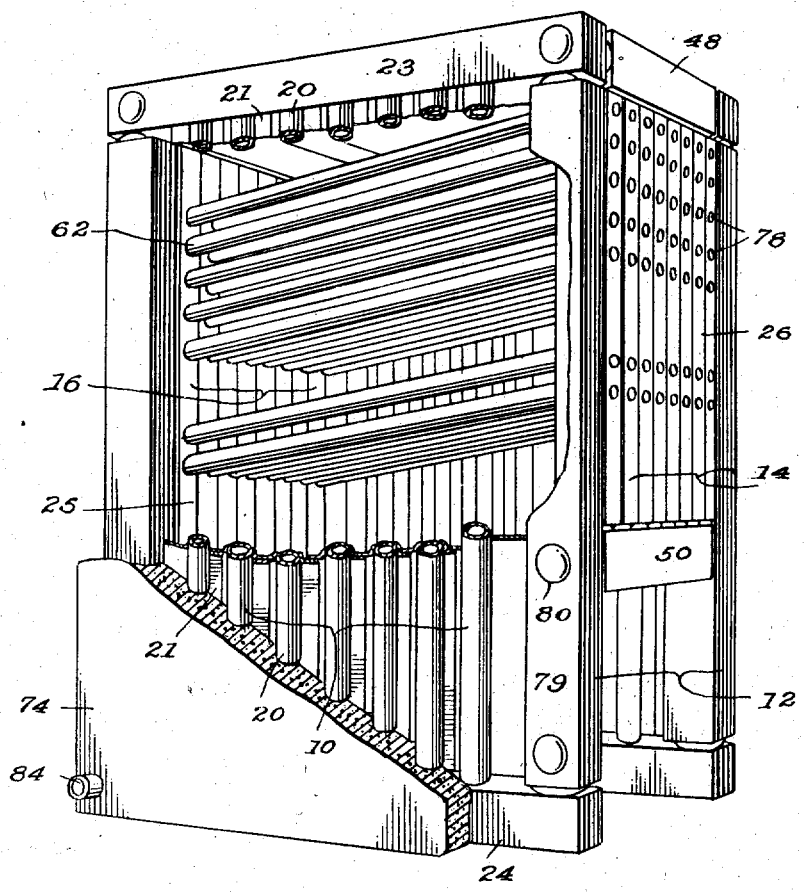
Fig. 1 is a perspective view of the boiler partly broken away.

The feed water may be introduced at one or more points and for this purpose, I have shown in Fig. 1 a pipe 84 entering the lower header 24. Similar feed pipes may be located at the opposite side of the boiler, or the feed water can be supplied from a common header to several of the tubular members 20.

The boiler walls may be supported in the usual manner on a floor or other foundation. Or walls of the kind described can be hung or suspended from the structural beams or girders in a power house or other building.

Boilers of the present type are designed to generate large quantities of steam at high temperature and pressure by the use of water walls immediately surrounding the combustion chamber, and utilizing the radiant heat of the burning fuel in addition to the inclined tubes above the combustion chamber heated by convection.

The improved boiler is designed to produce steam at a rate of several hundred per cent of the usual rating based on area exposed to the heating gases and requires for this result a high volume of intensely hot gas. It becomes important therefore to prevent the exposure of the usual masonry wall to the fire. Experience shows that such walls are rapidly deteriorated under modern high temperature firing. The metal fillers or extensions of the improved boiler form a shield which protects any outside sheathing, the tubes with the metal fillers or extensions constituting in effect a wall of the combustion chamber so that the plastic material on the outside may be a mere insulating sheathing supported by the wall of tubes and fillers.

The fillers or extensions have an additional function to conduct heat to the water tubes so rapidly as to utilize the intense heat of the fire. In installations of this character the distance to which the extensions may be carried beyond the tubes is limited. It must be so short that the heat is conducted to the tubes sufficiently rapidly to prevent the outer portions of the extensions from being burned away or distorted sufficiently to crack them. Such conduction of heat to the tube is affected by the area and the degree of contact of the extension member with the tube, but is chiefly dependent on the distance from the tube to the remotest part of the extension. Such distance puts a maximum limitation on the distance between the tubes in the case of high duty boilers (that is, steam generators as distinguished from mere water heaters or the like).

In practice, it is found that the maximum distance should not be substantially greater than the outside diameter of the tubes. The extensions beyond the tube, with such spacing, are of less width than the diameter of the tubes and can be kept within such limits as to avoid destruction by the fire.

Generally in boilers of the type on which the present invention is an improvement, particularly those designed to generate large quantities of steam at high temperature and pressure, the walls of the furnace support the overhead structure and are made of or lined with refractory brickwork which is exposed directly to the intense heat of the flame and which have a comparatively short life. There are frequent shutdowns for repair or replacement of such walls. The walls, of course, have to be maintained in good order to support the weight on them. It has been proposed also to use furnace walls of composite character, including refractory material and water tubes, as in the patent of Hutchison, No. 614,206, of November 15, 1898, and of Sewall, No. 1,090,947, of March 24, 1914, where the wall is made of tubes combined with refractory material on the inner face and the outer face.

According to this invention the principal part of the wall is the tubular metal structure and the refractory material is anchored to and supported thereby. The netting embedded in the plastic refractory coating anchors the latter in place against the face of the metal wall and prevents its being loosened or seriously damaged by the vibration or the slight relative movement of the tubular elements which occur in the use of large installations of this type. Not only does this provide for a high capacity because of the rapid generation of steam in the tubes; but also the life of the composite structure of metal and refractory is practically unlimited because of the cooling effect of the rapid circulation in the tubes.

Various modifications in the design and arrangement of the parts may be made by those skilled in the art without departing from the invention as defined in the following claims.

What is claimed is:

1. A steam generator including in combination approximately horizontal water tubes heated by convection and a furnace having a combustion chamber below said overhead tubes, a wall of said combustion chamber being composed of substantially upright tubes connected into the circulation of the generator, said tubes being spaced apart a distance not substantially greater than their diameter, and metal extensions from said tubes united thereto with good heat conducting joints and practically closing the spaces between them but being free to move separately, so that only the tubes and extensions are exposed to the heat of the burning fuel and the two together constitute the wall heated only on its inner face, the other surface of such wall being covered with insulating material.

2. A steam generator including in combination water tubes heated by convection and a furnace having a combustion chamber adjacent to said tubes, a wall of said combustion chamber being composed of water tubes connected into the circulation of the generator, said tubes being spaced apart a distance not substantially greater than their diameter, and metal extensions from said tubes attached thereto with good heat conducting joints and practically closing the space between them but being free to move separately, so that only the tubes and extensions are exposed to the heat of the burning fuel and the two constitute a wall heated only on its inner face, the outer face of said wall being covered with insulating material.

3. A stationary steam generator including in combination water tubes heated by convection and a furnace having a combustion chamber, a wall of said combustion chamber being composed of a number of substantially upright tubular elements comprising tubes with lateral metal extensions united thereto with good heat conducting joints, said tubes being connected into the circulation of the generator and being spaced apart a distance not substantially greater than their diameter and said extensions lying in the spaces between the tubes and providing an increased area exposed to the radiant heat of the burning fuel and conducting such heat to the tubes, said extensions being limited in width as a maximum to the diameter of the tubes, each element being disconnected from the next but so placed that the tubes and extensions constitute a wall exposed on the inner face only to the radiant heat of the combustion gases, the outer surface of such wall being covered with insulating material.

4. The stationary steam generator of claim 3, and means for holding said cover of insulating material against the outer surface of the wall, such means being united to the tubular elements composing the wall.

5. A steam generator including a furnace having a combustion chamber, a wall of said combustion chamber comprising substantially upright tubes connected into the circulation of the generator, said tubes being spaced apart and having metal extensions united thereto with good heat conducting joints and extending into the spaces between said tubes to substantially close said spaces but leaving said tubes independent one of the other, the inner face of the wall formed by said tubes and extensions being exposed to the heat of the combustion chamber, the outer surface of said wall being covered with insulating material and continuous anchoring means connected at intervals to the outer surface of said wall of tubes to hold said insulating material in close contact with the surface of said tubes and extensions.

6. A water wall for a combustion chamber which comprises spaced vertical water tubes having sidewise metal extensions into the spaces between said tubes substantially to fill said spaces while leaving said tubes independent one of the other, the inner surface of said wall facing said combustion chamber and a continuous insulating covering for the outer surface of said wall having attaching means extending continuously throughout said insulating covering and attached at intervals to said tubes by welding to hold said covering in close contact with the surface of said tubes.

7. The wall of claim 6 in which said retaining means comprises a reticulated material extending within said covering material and being brought at intervals in the area of said wall into contact with said tubes and being secured thereto.

8. A water wall for a combustion chamber of a boiler which comprises an upper and a lower header connected in the water circulation of said boiler and vertical tubes extending between said upper and said lower header to form a substantially continuous wall having an inner surface exposed to the heat of said combustion chamber and a continuous insulating covering for the outer surface of said wall and attaching means extending continuously in said covering and secured at frequent intervals to the outer surface of said water wall where the wall encloses said combustion chamber.

JOSEPH B. MURRAY.
THOMAS E. MURRAY, JR.
*Executors of the Estate of Thomas E. Murray, Deceased.*